Nov. 19, 1968  J. DRYON  3,411,639

DEVICE FOR HANDLING SHEET MATERIALS

Filed May 14, 1965  2 Sheets-Sheet 1

Nov. 19, 1968   J. DRYON   3,411,639
DEVICE FOR HANDLING SHEET MATERIALS
Filed May 14, 1965   2 Sheets-Sheet 2

United States Patent Office 3,411,639
Patented Nov. 19, 1968

3,411,639
DEVICE FOR HANDLING SHEET MATERIALS
Jacques Dryon, Auvelais, Belgium, assignor to Ateliers Heuze, Malevez et Simon Reunis Societe Anonyme
Filed May 14, 1965, Ser. No. 455,789
Claims priority, application Belgium, May 25, 1964, 520,740
5 Claims. (Cl. 214—6)

ABSTRACT OF THE DISCLOSURE

The invention consists of a mechanism for handling sheet material such as glass and selectively manipulating the separate sheets from a conveyor to deposit the same on either a stand which receives the sheets in upright position or a packing case or the like which accommodates the sheets in a horizontal position. The handling mechanism includes a frame having a plurality of mutually spaced bar means each carrying rollers thereon, the axes of which are parallel to the longitudinal axis of the conveyor, pivot means to one side of the conveyor for supporting such frame for tilting or swinging movement from a material receiving position overlying the conveyor and capable of receiving a plate or sheet, to a position past an upright or vertical position, clamp or gripping means on the frame on the side thereof remote from the pivot means for holding a plate or sheet during such swinging movement whereby a plate may be lifted and swung upwards by the frame to a position past the vertical where the plate can be released for deposit on the stand in a generally upright condition, and the frame includes extendable support means likewise provided with similarly oriented rollers, extendable between an inner position where the pivoting frame receives a plate and an extended position, so that upon partial upward swinging movement of the frame, a plate elevated thereby can roll off the rollers on the extendable support means for deposit in a packing case or the like in a horizontal position. The mechanism also includes means for swinging the frame and means for extending and retracting the extendable support means.

---

The invention relates to a device for handling sheet-like products such as glass, and is intended for removing said products from their production line and depositing them as required on a stand or into storage cases located adjacent to the handling device. When placed on the stands, the sheets are slightly inclined in relation to the vertical whereas when placed in the storage cases they are arranged horizontally.

In the production lines handling sheet-like materials such as glass, in particular those for grinding and polishing of glass on tables and working only one face at a time or, in twin processes, working simultaneously both faces of a continuous sheet and finally cutting to size and in the manufacture of armoured or printed or other types of glass, there are employed handling devices to remove the sheets from the production line and to deposit them on stands or into cases located adjacent to the production line. Handling devices are also used to pick up the sheets deposited on the stands to transfer them to another desired location on the line. The construction of the existing handling devices is of great diversity. In general, the material is gripped with the aid of suction cups mounted on a mobile frame, which is capable of executing rotary and translatory movements. They are constructed so as to effect either the transfer to a stand or into a packing case.

The material-handling device according to the present invention has the advantage of being capable of effecting the transfer from a conveyor line to a stand as easily as a transfer from a conveyor line into a packing case, and in addition is simple in construction and eliminates the use of a suction pump and its associated heads or cups.

Accordingly, the handling device of the invention includes a pivotal frame having the form of a grating, the bars of which can be lowered between the sheet transport rollers and can lift a sheet stopping above said grating by a pivoting movement of the frame. The pivoting frame includes a gripping means to hold the sheet while the frame moves into a substantially vertical position in order to deposit said sheet on the stand, as well as a retractable support making it possible to slide a sheet into a horizontal position in a packing case by a tilting movement of the frame.

Advantageously, the gripping means comprises pincers hingedly joined to the pivoting frame and capable of holding the sheet by one of its edges when placing it on the stand, while the retractable support preferably consists of bars lodged telescope-fashion between pairs of bars of the grating and capable of acting as extensions of said paired grating bars in a lateral direction. The upper face of the pivoting frame and of the retractable support carry rollers, the axis of rotation of which is arranged parallel to the pivotal axis of the frame.

The various elements of the handling device are driven by hydraulic, pneumatic, mechanical, electrical or other means.

The invention will now be described with reference to the accompanying drawings, which show an embodiment of the handling device of the invention, but in no restrictive sense.

Figure 1:
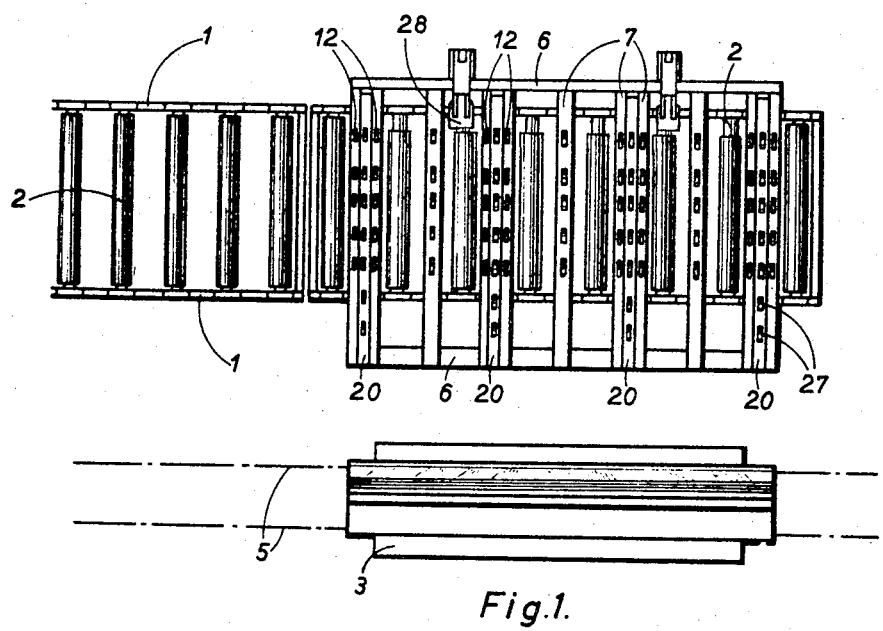
FIG. 1 is a plan view of the handling device of the invention.
Figures 2, 3:
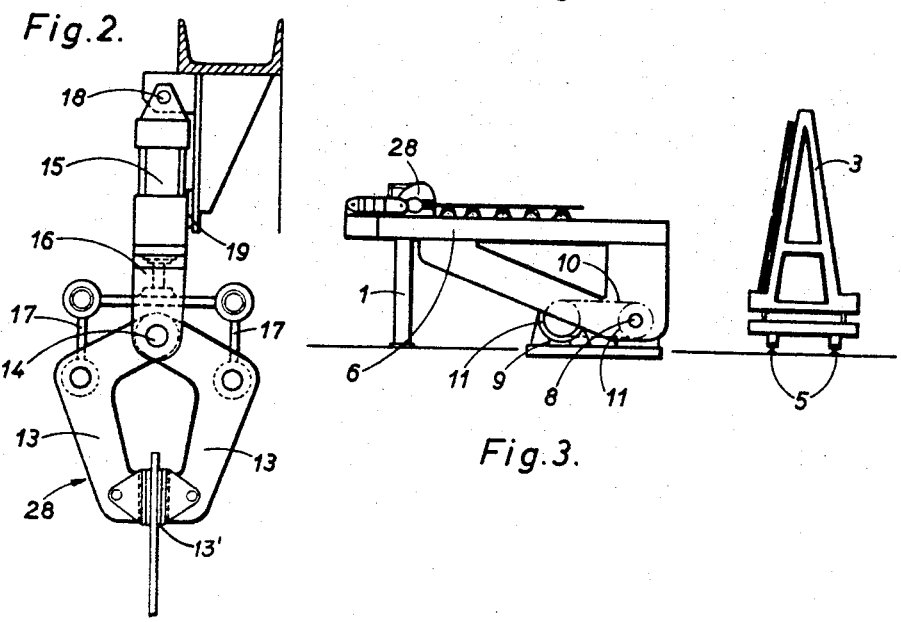
FIG. 2 is a view on an enlarged scale illustrating a gripping pincer clamp.
FIGS. 3 and 4 are schematical end elevational views of a handling device in two different positions during the transfer of a sheet to the stand.
Figure 4:
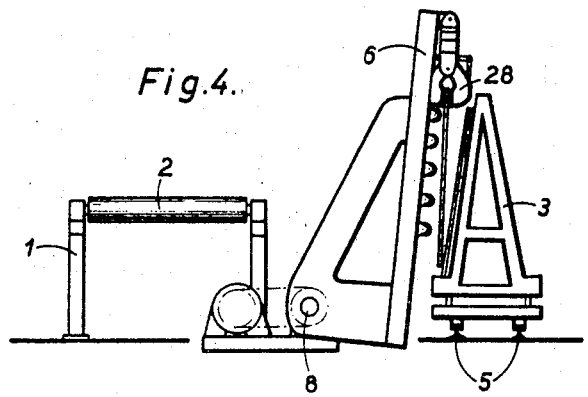

The individual plates or sheets of glass are conveyed by a transport mechanism consisting of a fixed frame 1 and rollers 2 capable of being driven intermittently by drive means not shown. The sheets to be handled rest on the rollers 2; a rotation of said rollers results in a rectilinear displacement of the pieces and makes it possible to transfer each sheet to the right-hand end of the handling device. In operation, the stand 3, (as can be seen in FIGS. 1, 3 and 4), or the packing case (FIG. 5) is located adjacent to but on one side of the handling device. The stand or the packing case can be moved along roller tracks 5 that are parallel to the roller conveyor.

Figure 5:
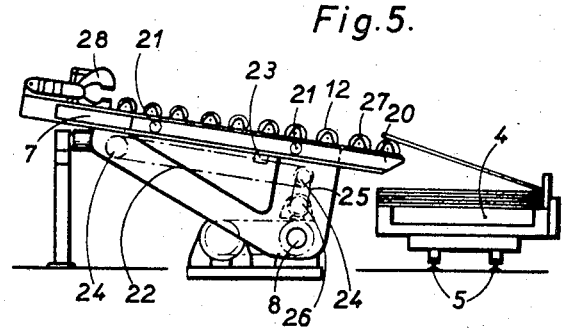
FIG. 5 is an end elevational view of the same handling device at the instant of depositing a sheet into a horizontal packing case.

According to the invention, the handling device comprises a movable frame 6 having the form of a grating the bars 7 of which are so dimensioned that they can be lowered between adjacent rollers 2 of the conveyor. This movable frame is capable of pivoting through an angle slightly greater than 90° about an axis 8 (as can be seen in FIGS. 3, 4 and 5). This pivoting movement can be effected by means of a drive motor-reduction unit 9 acting on a chain 10 trained over sprockets or wheels 11 one of which is fast with the drive shaft of the drive motor-reducing unit while the other sprocket is mounted on the pivot shaft 8 that is integral with the movable frame 6. The swinging of the frame can be effected by any other known mechanical, hydraulic or pneumatic arrangement. On the upper side of the bars 7 are the arranged rollers 12 mounted on bearings and axles, the latter being arranged parallel to the pivot axis of the movable frame.

On the movable frame, on pivots as at 18, pincers or clamps 28 (FIG. 2) are hingedly attached, each of these being constituted by jaws 13 having a lining 13' so as not to mar glass. The jaws are hinged on the axle 14, which is connected to a jack 15 by flanges 16. The advancing or return movement of a piston driven by a fluid effects a symmetrical closing and opening movement of the jaws by means of the actuation of hinged rods 17. The pivoting of the jack around the pivot 18 is limited by the stop 19 integral with the movable frame.

Figure 6:
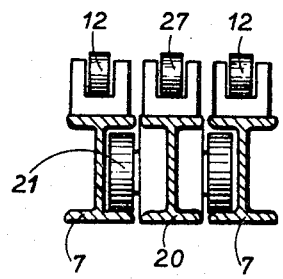
FIG. 6 is a fragmentary view illustrating a structural detail of the pivoting frame.

The retractable support is constituted by girders or bars 20 carrying rollers 21 (see FIGS. 5 and 6) capable of rolling along roller tracks formed by the lower flanges of the I-beam bars 7 of the movable frame 6. The advancing and return movement of the girders 20 is brought about by means of chains 22 connected to the girders by the attachments 23, sprocket wheels 24, a drive chain 25 and the drive motor-reduction unit 26. On their upper portion, the girders or bars 20 carry rollers 27 mounted at the same level as the rollers 12 of the bars of the movable frame 6 and with their axes likewise parallel to the pivot axis 8 of the movable frame.

Accordingly, to effect transfer of a glass sheet to the stand 3, the girders of the retractable support are retracted into the interior of the movable frame 6, the bars 7 of which are lowered below the plane of rollers 2 of the conveyor. When a sheet comes to a stop in range of the handling device, the clamping jaws are closed to grip an edge of the sheet, thereafter the movable frame is swung or pivoted about its axis of rotation. When the movable frame has rotated through an angle of 90°, the vertically held sheet is suspended by the jaws. Continuing the swinging or turning of the frame, the sheet moves parallel to itself, the jaws or pincers pivoting about the pivots 18, until the lower edge of the sheet comes into contact with the stand or with a sheet previously placed thereon, whereafter it inclines by a few degrees in relation to the vertical. The pivoting movement of the frame is then stopped and the jaws of the pincers are opened, which brings about a slight drop of the sheet. The sheet thus transferred rests against the previously deposited sheet without damage by reason of the cushion of air acting as a shock absorber. The movable frame is returned to its initial position and a new cycle can commence. Two stages of this cycle are shown in FIGS. 3 and 4.

To effect transfer of a sheet into a packing case, the bars on girders of the retractable support are withdrawn into the interior of the frame 6 the bars 7 of which are lowered below the rollers of the conveyor, as in the previous case for effecting transfer to a stand. After the arrival of a sheet above frame 6, the girders 20 of the retractable support are caused to advance laterally towards the waiting packing case, and the frame 6 is turned through a few degrees. At this instant, under the effect of its own weight, the sheet moves over the rollers 12 of the movable frame 6 and over the rollers 21 of the retractable support to meet a wall of the packing case (see FIG. 5). Following this, the girders 20 of the retractable support are withdrawn and the sheet thus handled comes to rest on the previously deposited sheet without damage owing to the cushion of air acting as a shock absorber. The movable frame 6 is returned to its initial position and a new cycle can recommence.

It is of course understood that the invention is not limited to the form of embodiment hereinbefore described and illustrated by way of an example and that modifications thereof are possible without exceeding the scope of the invention.

I claim:

1. A material handling mechanism for selectively manipulating and transferring individual sheets from a conveyor to either a stand which receives sheets in upright position or a support receiving sheets in horizontal position comprising a transfer frame, pivot means at one side of said frame supporting said frame for swinging movement about a horizontal axis parallel to the longitudinal axis of a conveyor, means for swinging said frame in opposite directions from a substantially horizontal sheet receiving position to an upright position and vice versa, releasable gripping means carried by the frame at the side thereof remote from said pivot means, said frame including extendible and retractable support means movable in a direction transverse of said pivot means between an inner sheet-receiving position and an outer sheet-depositing position and means for extending and retracting said last-mentioned support means whereby the transfer frame can receive a sheet and swing upwardly to upright position with the releasable gripping means with the sheet held by the gripping means until the desired position on the frame is reached, whereupon the sheet can be released therefrom and deposited in upright position or with the extendible support means retracted, said frame can be swung upwardly from a sheet receiving position through a slight arc and the extendible support means extended to deposit a sheet by gravity in a horizontal position.

2. A material handling mechanism, as claimed in claim 1, having means pivotally connecting the gripping means to the frame for swinging movement about an axis parallel to said horizontal axis.

3. A material handling mechanism, as claimed in claim 2, in which said transfer frame includes spaced parallel beams extending at right angles to said horizontal axis, rollers carried by said beams, pivots for the rollers arranged parallel to said horizontal axis, and said extendible and retractable support means including additional beams, each arranged between a pair of beams of said frame, and rollers on said additional support means similarly orientated with respect to said first-mentioned rollers.

4. A material handling mechanism, as claimed in claim 3, in which the beams of said transfer frame are I-shaped in cross section, rollers supporting said extendible and retractable support means rolling on adjacent flanges of said pairs of I-shaped beams of the transfer frame.

5. A material handling mechanism, as claimed in claim 4, in which said releasable gripping means comprises at least one pair of jaws, pivot means connecting the jaws, means for opening and closing the jaws, a support for said pivot means, additional pivot means connecting said support to said transfer frame, said pivot means and additional pivot means being disposed parallel to said horizontal axis.

References Cited

UNITED STATES PATENTS

| | | | |
|---|---|---|---|
| 1,476,050 | 12/1923 | Buttress | 214—7 |
| 1,556,695 | 10/1925 | Kronberg | 214—1 |
| 1,931,700 | 10/1933 | Murphy et al. | 214—1 |
| 1,983,755 | 12/1934 | Heichert | 214—1 |
| 3,021,169 | 2/1962 | Harry | 294—115 |
| 3,154,201 | 10/1964 | Busch | 214—6 |
| 3,178,041 | 4/1965 | Wheat | 214—6 |

FOREIGN PATENTS

| | | |
|---|---|---|
| 901,157 | 1/1954 | Germany. |
| 628,877 | 11/1961 | Italy. |

ROBERT G. SHERIDAN, *Primary Examiner.*

R. J. SPAR, *Assistant Examiner.*